June 15, 1943.  R. C. TALBOT ET AL  2,322,175
MACHINE FOR SUPPLYING INSERTS TO PACKAGES
Filed Aug. 2, 1940  6 Sheets-Sheet 6

Inventors
Richard C. Talbot
Frederick L. Beyer,
By
Attorneys

Patented June 15, 1943

2,322,175

UNITED STATES PATENT OFFICE 2,322,175

MACHINE FOR SUPPLYING INSERTS TO PACKAGES

Richard C. Talbot and Frederick L. Beyer, Durham, N. C., assignors to Wright's Automatic Tobacco Packing Machine Company, Durham, N. C., a corporation of North Carolina Application August 2, 1940, Serial No. 349,890

22 Claims. (Cl. 226—2)

The present invention relates to a machine for supplying inserts to packages and other articles, and the primary object of the invention is to provide such a machine which is capable of operating automatically, thus saving the time and labor involved in performing such operations manually.

A more particular object of the invention is to provide a machine of this character for automatically inserting books of, for example, cigarette papers, into the wrappers of, for example, packages of smoking tobacco.

A further object of the invention is to provide a machine of this character which is capable of automatically inserting the books or the like in the wrappers of packages as the latter are delivered from a wrapping or packaging machine.

To these and other ends, the invention consists in certain improvements and combinations and arrangements of parts, all as will be hereinafter more fully described, the features of novelty being pointed out more particularly in the claims at the end of this specification.

In the accompanying drawings.

Similar parts are designated by the same reference characters in the different figures.

In the present instance, the invention is shown applied to a machine for automatically inserting books of cigarette papers into diagonal slits formed in the sides of tobacco packages. The tobacco packages to receive the books may be fed in any suitable way to the machine, but they are preferably fed to the book inserting machine as they are delivered from a machine of the general class shown and described in U. S. Patent No. 1,698,585 granted January 8, 1929 which applies labels or wrappers and revenue stamps to the packages, so that the tobacco packages as they are delivered from such a machine are supplied automatically with the books of cigarette papers, after which the packages are ready for packing in cartons or to be otherwise disposed of.

In the present instance, I designates a table which may be mounted at the delivery end of the machine which applies the labels or wrappers to the tobacco packages, this table having a runway 2 of channel-like form mounted thereon to guide a row of the packages A in endwise abutting relation as they are delivered from the labelling or wrapping machine. The packages may be ejected for example successively from the pockets 4 in an intermittently rotatable mold wheel 5 by a reciprocatory ejector 6 which is operated, as each pocket in the mold wheel is brought into alignment with the runway, by a lever 7 on a shaft 8 pivoted on the frame 9 of the packaging or labelling machine, the shaft 8 having an arm 10 fixed thereon and connected to a cam yoke 11 the roller 12 of which cooperates with a cam 13 mounted on a shaft 14. In such an arrangement, a package will be ejected from a pocket on the mold wheel as each pocket thereon is brought into alignment with the runway, and the ejected package will engage and push the packages ahead of it endwise through the runway 2. The wrappers or labels of the packages are previously provided with a slit *a* in a side thereof into which the books of cigarette papers are to be inserted. These slits may be provided in the wrappers or labels of the packages before they are applied to the inner wrappers, or in any other suitable way.

Figure 2:
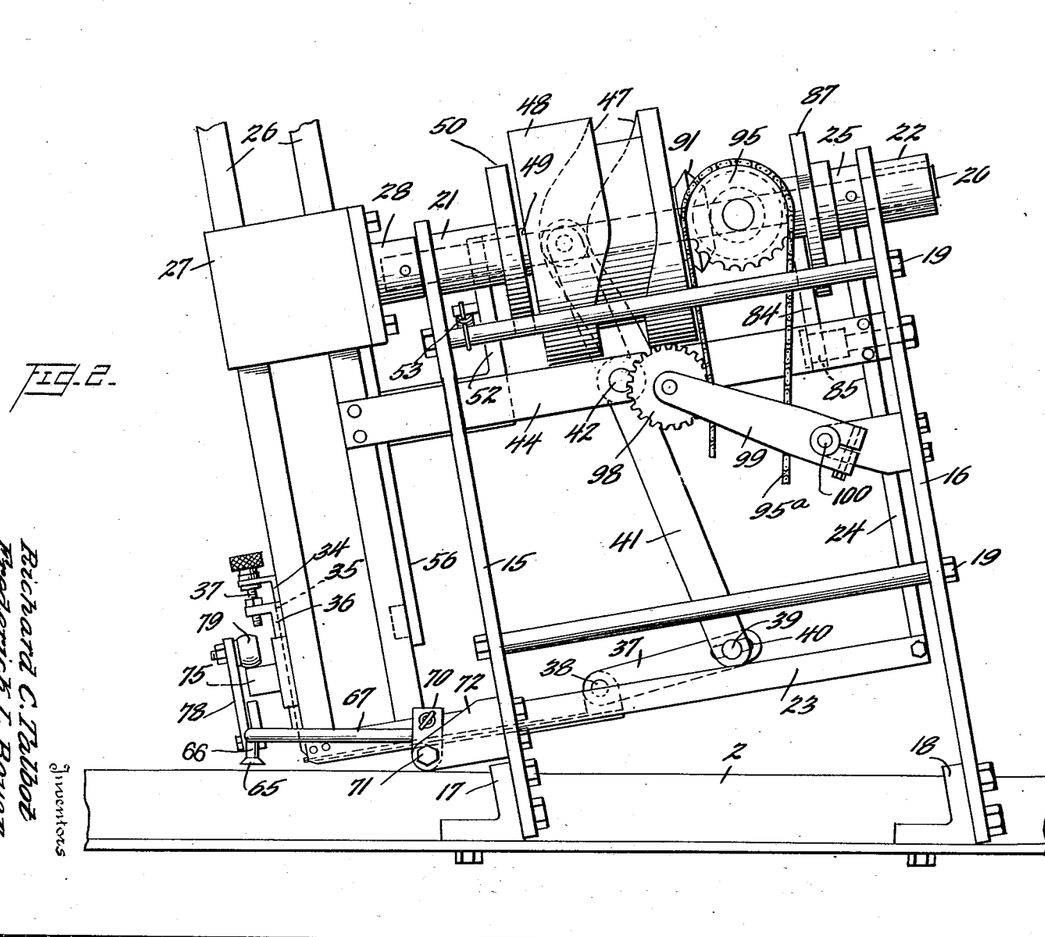
Fig. 2 is a side elevation of the machine on an enlarged scale.
Figure 3:
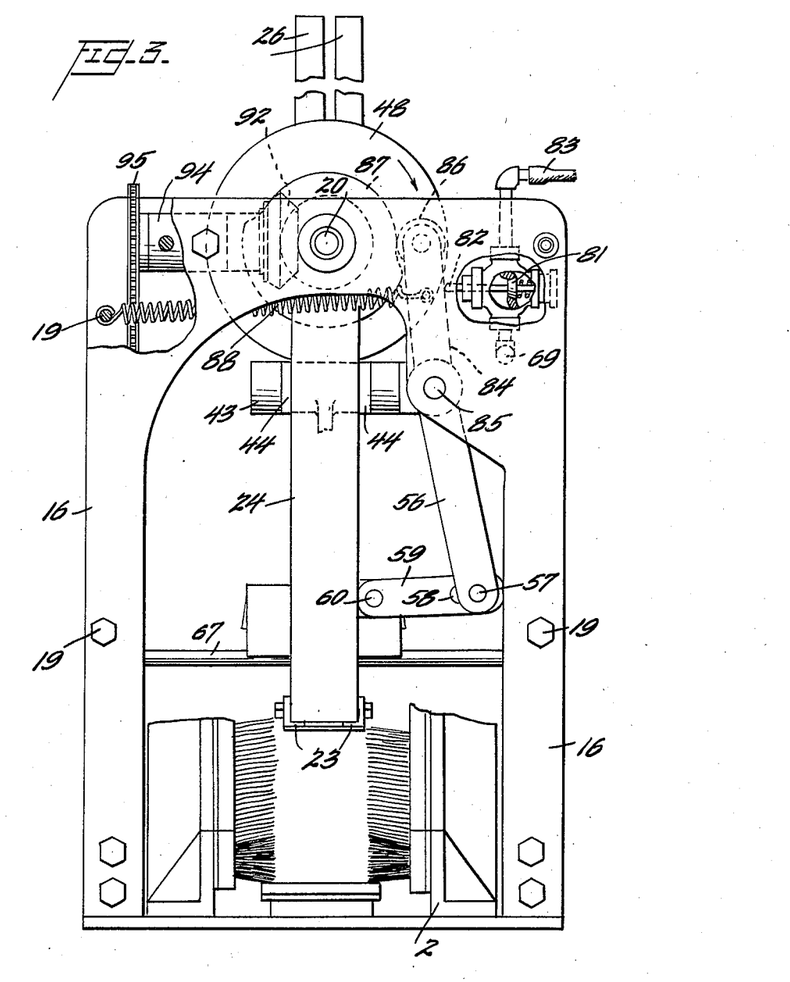
Fig. 3 is a rear elevation of the machine as viewed from the right in Fig. 2 and in the direction of inclination of the machine relatively to the runway for the packages.
Figure 4:
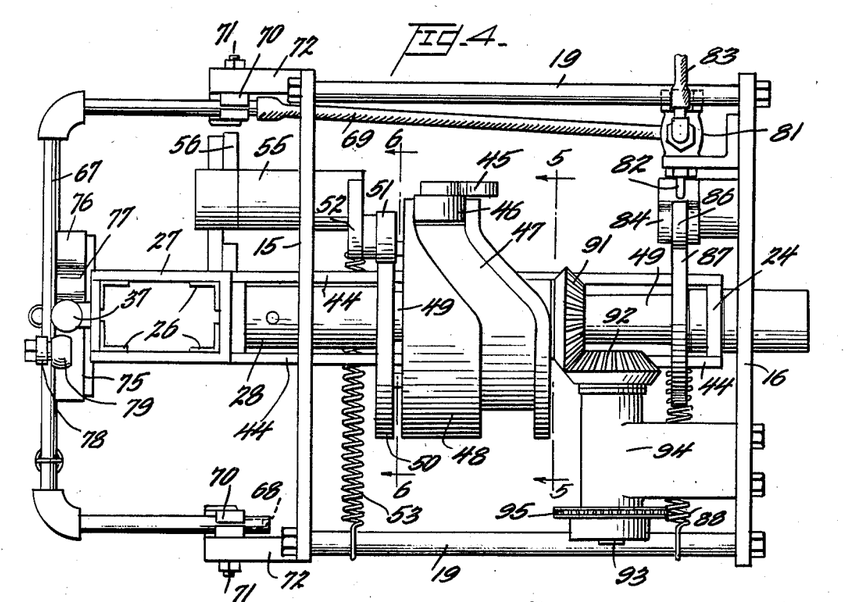
Fig. 4 is a top plan view of the machine as viewed from the top of Fig. 2 and in the direction of inclination of the machine as shown in that figure.
Figure 5:
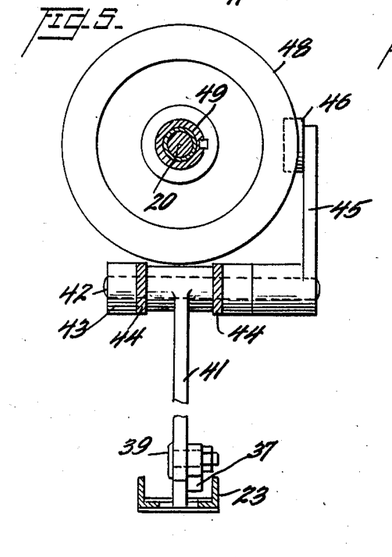
Fig. 5 is a detail vertical section, taken on the line 5—5 in Fig. 4, showing the operating means for the book ejector.
Figure 6:
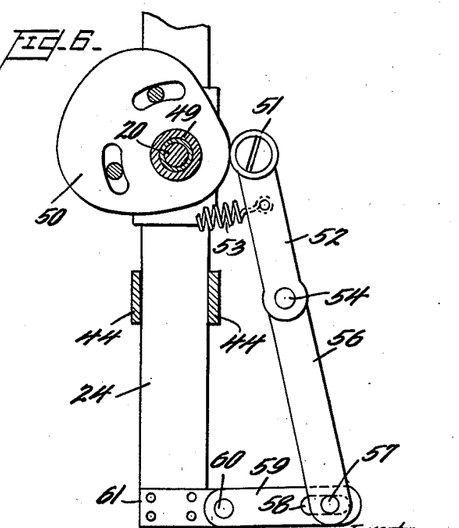
Fig. 6 is a detail vertical section, taken on the line 6—6 in Fig. 4, showing the operating means for the book magazine.

The book inserting means provided by the present invention comprises front and rear frames 15 and 16 which are supported rigidly on the table 1 by brackets 17 and 18 which may be bolted or otherwise fixed thereto, these frames straddling the package runway, as shown in Fig. 3. The frames 15 and 16 are rigidly connected by a suitable number of tie rods 19 which connect them, and a shaft 20 is journalled to rotate in bosses 21 and 22 in the upper portions of the front and rear frames. A pair of angle irons 23 are pivotally supported to swing laterally in the frame of the machine by an arm 24 which is bolted or otherwise fixed at its lower end to the angle irons 23 and has a hub 25 at its upper end which is pinned or otherwise fixed to the shaft 20, and the forward ends of the angle irons 23 are bolted or otherwise fixed to a book magazine comprising a set of four angle irons 26, the magazine comprising these angle irons being mounted in a bracket 27 having a hub 28 which is pinned or otherwise fixed to the forward end of the shaft 20. The angle irons 23 are parallel and have two of their flanges turned toward one another in the same plane, the other flanges of these angle irons being turned upwardly and thus providing a channel which at its forward end receives the lower end of the magazine and provides a guide for the ejection of the books from the magazine. Since the channel formed by these angle irons is supported at its ends by the arm 24 and the book magazine, and said arm and the book magazine are pinned or otherwise fixed on the shaft 20, the latter provides a pivot for the swing of the angle irons 23 and the book magazine laterally within the frame of the machine. The channel formed by the angle irons 23 is mounted in an inclined position, as shown in Fig. 2, so that its forward end will occupy a position immediately above the package runway 2 when the magazine is swung into a position above such runway, and the magazine in which the books are stacked preferably occupies a correspondingly inclined position as shown in Fig. 2, so that the lowermost book in the magazine will rest flatwise on the inturned flanges of the channel irons 23.

The books are ejected from the bottom of the magazine by an ejector 30 which reciprocates longitudinally between the angle irons 23. The ejector comprises preferably a top plate 31 which overlies the inturned flanges and operates between the upturned flanges of the angle irons 23, a bottom plate 32 which underlies the inturned flanges of these angle irons, and an intermediate relatively narrow plate 33 which lies between the inner edges of the inturned flanges of the angle irons, these three plates being riveted or otherwise fixed to one another and slidable longitudinally of the channel irons. This ejector reciprocates across the bottom of the book magazine and, in doing so, engages the lowermost books therein and thereby ejects them from the lower forward corner of the magazine. By employing a top plate 31 of the appropriate thickness, the ejector may be made to eject the books either singly or to eject two or more books simultaneously from the magazine upon each forward reciprocation of the ejector. The height of the discharge opening in the lower forward corner of the magazine may be adjusted to conform with the number of books to be ejected at each operation of the ejector by a plate 34 the lower end of which determines the height of the book discharge opening in the magazine, this plate being guided to slide vertically in a groove 35 formed in the rear face of a bracket 36 which is bolted or otherwise secured to the front of the magazine. A screw 37 mounted rotatably in the forwardly bent upper end of the plate 34 and threaded in the top of the bracket 36 serves to adjust the height of the plate 34.

Figures 1, 11, 12:
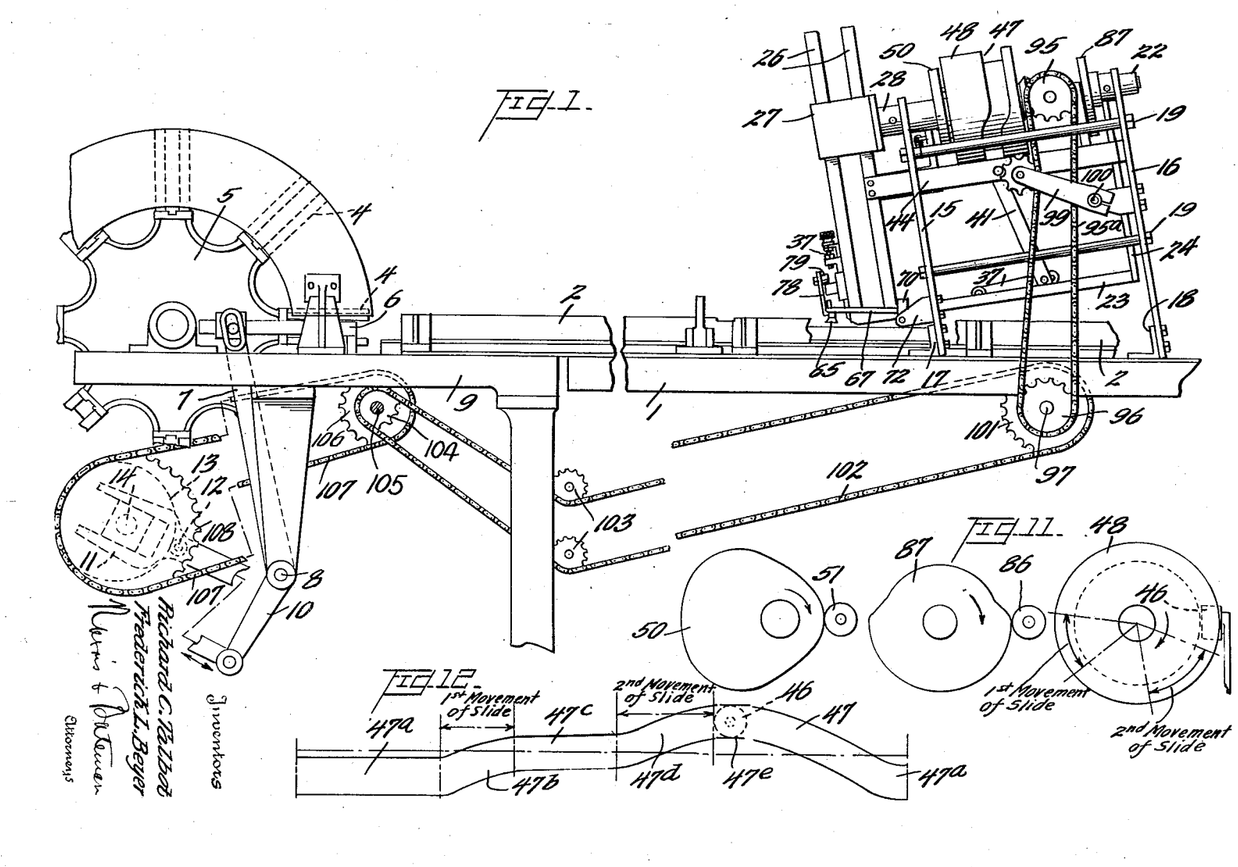
Fig. 1 is a side elevation of a machine for inserting books of cigarette papers into packages of smoking tobacco in accordance with the present invention, the machine being shown arranged to receive the packages of tobacco from a machine which applies labels or wrappers thereto.
Fig. 11 is a diagrammatic view showing the shapes and relative timing of the cams.
Fig. 12 is a development of the book ejector cam.

The ejector 30 is reciprocated by a link 37 which is pivotally connected at 38 to a bracket riveted or otherwise fixed to the rear end of the ejector, the other end of this link being adjustably connected by a shouldered pivot bolt 39 extending through a slot 40 in the link and secured to the lower end of an operating lever 41. The upper end of this lever is pinned or otherwise fixed to a shaft 42 which is mounted in bearings 43 supported by bars 44 fixed to the arm 24 and to the rear angles of the book magazine, the shaft 42 having an arm 45 fixed thereon and carrying a roller 46 which operates in the groove 47 of a barrel cam 48, the latter being keyed or otherwise fixed on a cam sleeve 49 which is supported and journalled to rotate on the shaft 20. The cam groove 47 is so shaped as to advance the ejector 30 through a portion of its forward stroke so as to eject the book for about one-half of its length from the magazine and, after a dwell, to advance the ejector through the rest of its stroke and thus complete the ejection of the book. As shown in Fig. 12, which represents a development of the cam groove 47, this groove has a portion 47$^a$ which the roller 46 occupies when the ejector is retracted, an inclined portion 47$^b$ which the roller traverses to reach a dwell 47$^c$ when the ejector has ejected the book a half or other desired portion of the length thereof, and an inclined portion 47$^d$ which the roller 46 traverses to reach a section 47$^e$ at which point the book ejecting stroke of the ejector has been completed.

According to the present invention, the book magazine and the channel formed by the angle irons 23 are swung laterally to one side of the package runway 2 after insertion of a book or books in one package and during the advance of the row of packages to bring the next package in the row in the runway into book receiving position, after which the magazine is swung back or returned to a position above the next package in the runway. The means for thus swinging the magazine comprises a cam 50 keyed or otherwise fixed on the cam sleeve 49 so as to rotate therewith, this cam cooperating with a roller 51 mounted on the upper end of a lever 52, the latter being connected to one end of a tension spring 53 the other end of which may be attached to a suitable part of the stationary frame of the machine, as to one of the tie rods 19, this spring acting to hold the roller 51 in contact with the cam 50. The lower end of the arm 52 is pinned or otherwise fixed to a shaft 54 which is mounted rotatably in a bearing 55 on the front frame member 15, this shaft having an arm 56 fixed thereon and adjustably connected to the lower portion of the magazine by a shouldered pivot bolt 57 which extends through a slot 58 in one end of a link 59, the other end of this link being pivotally connected at 60 to a bracket 61 riveted or otherwise fixed to the lower portion of the magazine. By this arrangement, the lower end of the magazine will be swung to and from a position above the path of the packages in the package runway during each revolution of the cam 50.

The present invention provides means for lifting a portion of the wrapper or label of the package at one side of the slit therein in order to insure insertion of a corner of the book or books into the slit as the magazine is swung into a position above the respective package. Preferably and as shown in the present instance, such means comprises a suction cup 65 which is composed preferably of yieldable rubber and is attached to the lower end of a suction tube 66 the latter being attached to the underside of and communicating with a suction pipe 67 which is preferably in the form of a yoke one end of which is suitably closed as by solder 68 and the other end of which is connected to a flexible suction hose 69. The ends of the pipe 67 are secured in split clamps 70 which are pivoted at 71 on brackets 72 bolted or otherwise fixed to the front plate 15 of the frame so that the suction pipe 67 may swing upwardly and downwardly about the pivots 71 as an axis, thereby raising and lowering the suction cup 65. The suction cup 65 is located directly above the runway 2 for the packages and is in a position to engage the wrapper or label of the package at a side of the slit $a$, as shone in Fig. 18, when the package comes to rest in its advance along the runway and the suction cup is lowered.

The present invention provides means for automatically lowering the suction cup to engage a package and for raising the suction cup to open the slit therein as the magazine swings into book inserting position above the package. Preferably and as shown in the present instance, such means comprises a cam 75 which is bolted or otherwise secured to the forward side of the magazine, this cam having a surface 76 which is concentric with the axis of the shaft 20 about which the magazine swings, except for a recess or drop 77, and the suction pipe 67 has a bracket 78 clamped or otherwise fixed thereon, this bracket carrying a roller 79 which rides on the cam 75. A tension spring 80 is preferably attached to the suction pipe 67 and to the top of the table 1, it acting to maintain the roller 79 in contact with the cam 75. This cam is so shaped and positioned that when the magazine is swung to one side of the package runway, the roller 79 will rest on the concentric raised portion of the cam and will thereby hold the suction cup 65 in its elevated position, but as the magazine swings back to a position above the package runway, the roller 79 will drop into the recess 77 in the cam, thereby causing the suction cup to descend onto a package in the runway immediately beneath it, thereby engaging the portion of the wrapper or label of the package adjacent to the slit therein, and as the magazine continues its swing into a position above the package runway, the roller 79 rides up out of the recess 77, thereby causing the suction cup, which is connected to a source of suction, to open the slit, as shown diagrammatically in Fig. 18.

The present invention provides means for automatically establishing a suction at the suction cup 65 at or before the time this suction cup descends into engagement with the package and for interrupting such suction after the suction cup has been lifted and a corner of the book has been inserted in the package. Such suction controlling means comprises a valve 81 which may be of any suitable or well known form having a plunger 82 which, when pressed inwardly, will open the valve and, when released, will permit the valve to close under the action of a spring within the valve. This valve is connected by a hose 83 to a vacuum pump or other suitable source of suction at its outlet side, and its inlet side is connected by the hose 69 to the suction pipe 67. The vacuum controlling valve is opened and closed at the appropriate times by a lever 84 which is pivoted at 85 on the rear frame 16, the upper end of this lever carrying a roller 86 which cooperates with a cam 87 and is held in engagement therewith by a tension spring 88 one end of which is attached to the lever 84 and the other end of which is attached to a relatively fixed part of the machine frame, as to one of the tie rods 19. The bracket 78 carrying the cam roller 79 is secured to the suction pipe 67 as by clamping bolts 89 at such a distance to one side of the suction cup 65 as to enter the recess or drop 77 in the cam 75 as the magazine commences its lateral swing over the package runway, thereby lowering the suction cup on the top of the wrapper of the package below it, and to rise from this recess and thereby lift the suction cup before the magazine reaches the limit of its swing over the package runway, and the cam 87 is so shaped and set as to open the valve 81 at or immediately prior to the time the roller 79 enters the cam recess or drop 77, thereby establishing a suction in the cup 65, and to close this valve after the roller 79 has arisen from the cam recess or drop 77, thereby breaking the vacuum on the suction cup.

The cam sleeve 49 on which the cams 48, 50 and 87 are fixed is rotated continuously during the operation of the machine by a bevel gear 91 which is fixed on the cam sleeve and meshes with another bevel gear 92 of equal size, the latter being fixed on one end of a shaft 93 which is journalled in a bearing 94 which is bolted or otherwise fixed to the rear frame member 16, the other end of this shaft having a sprocket 95 fixed thereon over which a sprocket chain 95ª passes. This sprocket chain is driven from a sprocket-wheel 96 fixed on a shaft 97 mounted in suitable bearings on the underside of the table 1, and a slack take-up idler sprocket 98 preferably cooperates with this sprocket chain, it being journalled in an arm 99 which is clamped or otherwise adjustably secured to a supporting stud 100 which is bolted or otherwise fixed to the rear frame member 16.

The shaft 97 may be driven in any suitable way to operate the book inserting machine in proper timed relation to the step-by-step advance of the packages along the runway 2 so that the books will be inserted in the wrappers of the packages successively during the periods of rest between the advancing movements of the packages. In the present instance, this shaft is driven continuously from the wrapping machine from which it receives the packages, the shaft 97 having a sprocket 101 fixed thereon to cooperate with a chain 102 which passes around a pair of idler sprockets 103 and then around a sprocket 104 which is one-half the diameter of the sprocket 101. The sprocket 104 is fixed to the drive shaft 105 of the wrapping machine, and this shaft has a sprocket 106 fixed thereon which is connected by a chain 107 to a sprocket 108 of twice its diameter fixed on the shaft 14 of the cam 13 which operates the ejector 6. Consequently, the cam sleeve 49 and the cams thereon make one revolution for each reciprocation of the package ejector 6 which advances the packages along the runway, and the cams in the book inserting machine are so set relatively to the ejector operating cam 13 as to cause the book inserting machine to perform its complete cycle of operations during each to-and-fro reciprocation of the package ejector.

Figure 7:
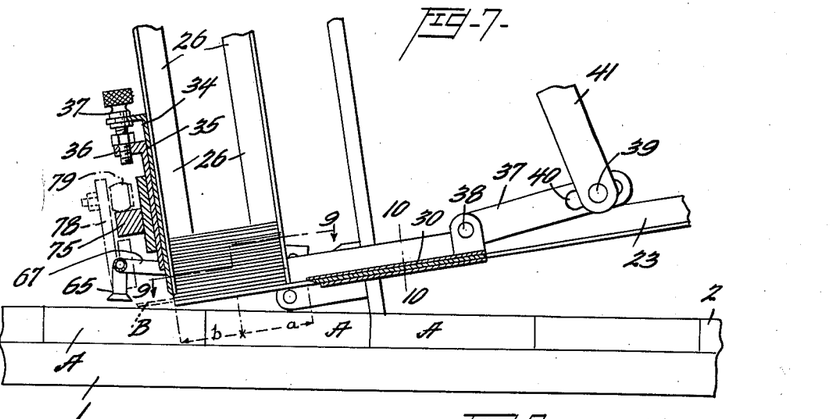
Fig. 7 is a detail vertical section of the book delivery end of the magazine in cooperation with a package in the runway.
Figures 8, 9, 10:
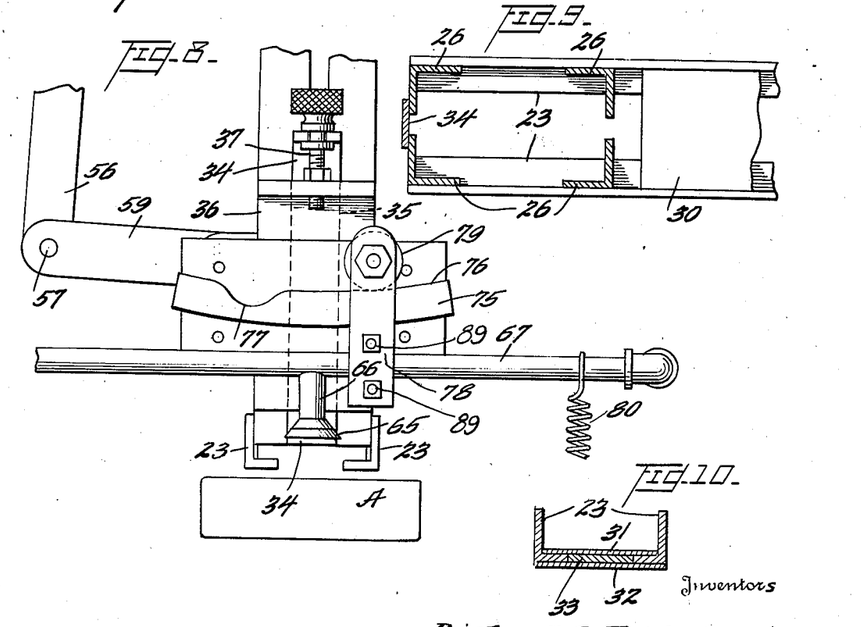
Fig. 8 is an elevation, on an enlarged scale, of the book delivery end of the magazine.
Fig. 9 is a detail transverse section, taken on the line 9—9 in Fig. 7.
Fig. 10 is a detail transverse section, taken on the line 10—10 in Fig. 7.

The relative setting of the cams of the book inserting machine is indicated diagrammatically in Fig. 11, from which it will be noted that approximately the first half revolution of these cams will cause the magazine operating cam 50 to swing the magazine laterally from a position above the package runway to its extreme position to one side thereof and during this half revolution, the cam 87 will allow the vacuum valve 81 to remain closed. During this approximately first half of the revolution of the cams, the roller 46 of the cam 48 travels from the section 47$^e$ of this cam to the section 47$^a$ thereof, thereby retracting the ejector 30 from beneath the pile of books in the magazine, and during the further or second half of the revolution of the cams, the cam 50 allows the magazine to swing down into a position above the packages in the package runway and as the magazine approaches this position, the cam 87 operates the vacuum valve 81 to establish a vacuum at the suction cup 65. Also, during this return swing of the magazine to a position above a package in the package runway, the roller 46 of the cam 48 travels along the inclined portion 47$^b$ of this cam to the dwell 47$^c$ therein, thereby operating the ejector 30 through a part of its ejecting stroke as indicated at $a$ in Fig. 7, thus ejecting a book for example about one-half its length from the bottom of the magazine, and after the magazine reaches its position above the package in the runway, the continued rotation of the cam 48 causes its roller 46 to traverse the second inclined portion 47$^d$ and to reach the portion 47$^e$ of this cam, thereby operating the ejector 30 through the remaining distance indicated at $b$ in Fig. 7, thus completing the ejection of the book from the magazine.

The construction and operation of the different mechanisms of the machine having been described in detail, the general operation of the machine is as follows:

Assuming the machine to be arranged to receive substantially rectangular packages A ejected successively from a package wrapping machine by reciprocations of a package ejector 6, the wrappers of the packages being previously provided with diagonal slits $a$ in their upper sides, and also assuming the book magazine to contain a stack of books B and the book inserting machine to be driven in timed relation with the reciprocations of the package ejector 6, as hereinbefore described, it will be understood that a row of the packages, abutting end to end, will be advanced intermittently or step by step along the runway 2, the booking machine being placed so that the book delivery opening in the lower end of the magazine will be brought above each package as it comes to rest in the runway.

Figure 13:
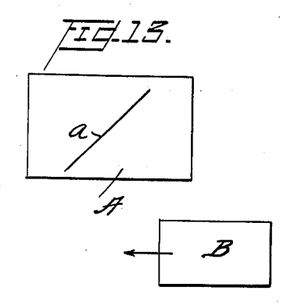
Figs. 13, 14, 15 and 16 are diagrammatic views showing the successive steps in the introduction of the books of cigarette papers into the slits in the wrappers.
Figure 14:
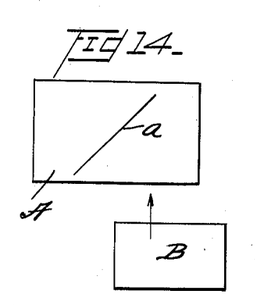
Figure 15:
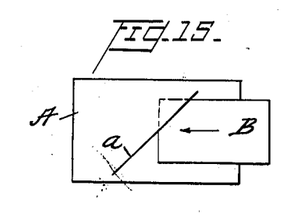
Figure 16:
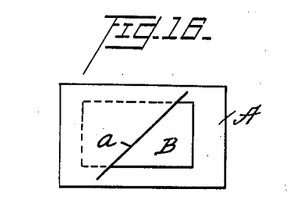
Figure 17:
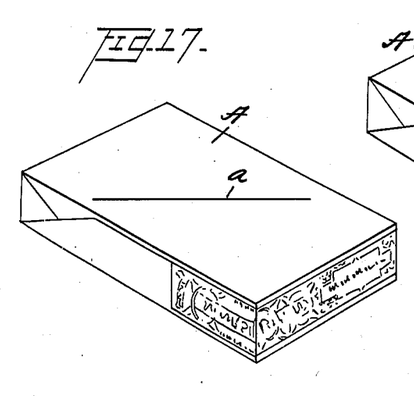
Fig. 17 is a perspective view of one of the packages, showing the diagonal slit in its wrapper or label.
Figure 18:
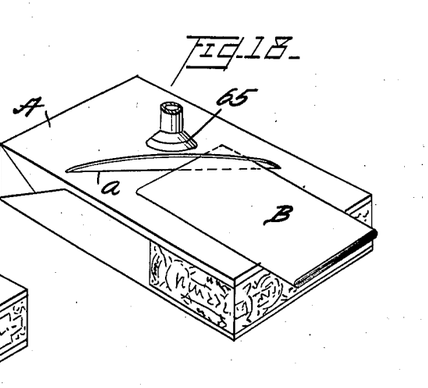
Fig. 18 is a perspective view showing diagrammatically the manner in which the slit in the wrapper is opened to initially receive a book of cigarette papers.

The cams 48, 50 and 87 make one revolution to perform each cycle of operations of the machine. Each revolution of the cam 50 causes the magazine to swing with the shaft 20 as an axis, to and from a position above the package runway. During these swinging movements of the magazine and as the magazine swings to one side of the package runway after inserting a book, the cam 48 first operates, by the travel of the roller 46 from the portion 47$^e$ to the portion 47$^a$ in the cam groove 47, to retract the ejector 30, and as the magazine commences its return swing, the roller traverses the portion 47$^b$ of the groove and advances the ejector 30 through the distance $a$ in Fig. 7 to partially eject one or more books B, depending upon the vertical thickness of the top plate 31 of the ejector, from the magazine, so that an end of the book or books will project beyond the magazine and at a downward inclination due to the inclination of the angle irons 23, a book B during its partial ejection being moved from its position in the magazine as shown in Fig. 13 to that shown in Fig. 14. As the magazine swings toward a position above the package at rest in the runway, the ejector 30 remains substantially at rest, the roller 46 being then travelling in the portion 47$^c$ of the cam groove 47, and the leading corner of the projecting and downwardly inclined book travels laterally toward the diagonal slit $a$ in the upper side of the wrapper of the package, as indicated in Fig. 14. During the swing of the magazine to a position above the package resting in the runway, the cam 75 allows the suction cup to drop onto the upper side of the package wrapper adjacent to the slit $a$ and the cam 87 opens the vacuum controlling valve 81 to establish a suction in the suction cup 65, following which the cam 75 lifts the suction cup, thereby causing the suction cup to lift the portion of the package wrapper beyond the slit $a$, immediately following which the lateral travel of the book B causes its leading corner to enter the pocket in the package wrapper provided by the opened slit as indicated in Figs. 15 and 18. After the magazine reaches its limit of swing above the package in the runway, the cam 48 operates the ejector 30 through the distance $b$ in Fig. 7, by the travel of the roller 46 in the portion 47$^d$ in the cam groove 47, thus moving the book or books a second step endwise from the position shown in Fig. 15 to that shown in Fig. 16, thereby completing the ejection of the book or books from the magazine and insertion thereof into the wrapper of the package, after which the cam 87 allows the valve 81 to close to break the vacuum at the suction cup 65 and thus release the wrapper of the package from the suction cup.

During each swing of the magazine laterally from a position above the package runway, after the insertion of the book or books into the wrapper of a package, the cams of the book inserting machine reset the parts thereof, and the package ejector 6 of the package wrapping machine makes its next forward stroke to eject another package from the package wrapping machine and advance the row of packages ahead of it in the runway to an extent to remove the package which has just received a book or books and to bring the next package into book receiving position.

The retraction of the ejector from beneath the stack of books in the magazine, which takes place as the roller 46 returns to the portion 47$^a$ of the cam groove 47, allows the stack of books to drop onto the inturned horizontal flanges of the angle irons 23, so that the lowermost book or two or more books, according to the thickness of the top plate 31, will be in front of this plate ready for ejection at the next forward stroke of the ejector. By employing top plates 31 of different thicknesses on the ejector and correspondingly adjusting the height of the plate 34 beneath which the books are discharged from the magazine, the machine may be adjusted to insert one, two or more books into the wrapper of each package, as may be desired.

By feeding the book or books at a downward inclination from the bottom of the book magazine and at an acute angle to the upper sides of the packages, and locating the magazine so that the book delivery opening in its lower end will be immediately above the upper side of a package in the package runway when the magazine is brought into a position above the runway, the forward end of the book or books, when partially ejected from the magazine, will be brought into contact with the upper side of the package when the magazine is swung into position above the package runway, and initial entry of the forward corner of the book or books into the pocket formed by the slit provided in the upper side of the package is thereby facilitated. The suction cup which operates to lift the upper side of the wrapper of the package adjacent to the slit, opens this side of the wrapper at one side of the slit while the projecting end of the book or books press down the top of the wrapper at the other side of the slit, thereby insuring entrance of the book or books through the slit in the wrapper and avoiding tearing of the wrapper. The final portion of the ejecting movement of the book or books takes place endwise of the package, thereby enabling the book or books to be inserted in the wrapper of the package well below the slit, thus insuring retention of the book or books by the package. The two step ejection of the book or books and the partial insertion of the book or books into the wrapper of the package by a lateral movement after the book or books have been partially ejected enables the machine to perform the book inserting operation during a minimum period of rest of the packages in their advance through the runway, thereby enabling the machine to insert the book or books into the package wrappers as rapidly as the packages are delivered by a wrapping or packaging machine.

Although the invention is herein shown and described as applied to a machine for inserting books of cigarette papers into the wrappers of tobacco packages, the invention is not limited thereto as it may be applied to the supplying of other inserts or objects to articles of various kinds, and it is to be understood that such other uses of the invention are to be included within the scope of the claims.

We claim as our invention:

1. In a machine for supplying inserts to packages, the combination of means for supporting a package having a slit in a side thereof, means for partially introducing an insert into said slit by movement of the insert in a given plane in one direction relatively to the package, and means for introducing the insert to a further extent into said slit by movement of the insert in said plane but in another direction relatively to the package.

2. In a machine for supplying inserts to packages, the combination of means for supporting a rectangular package having a slit extending diagonally in a side thereof, means for introducing an end of an insert into said slit by relative movement of the insert and package in a given plane in the direction of one dimension of the package, and means for introducing the insert to a further extent into said slit by relative movement of the insert and package in said plane but in the direction of another dimension of the package.

3. In a machine for supplying inserts to packages, the combination of means for advancing packages having pockets therein provided with openings extending diagonally of the direction of advance of the packages, means for moving an insert transversely of the direction of advance of the packages to introduce an end of the insert into the pocket of a package, and means for moving the insert longitudinally of the direction of advance of the packages to further introduce the insert into the pocket of the package.

4. In a machine for supplying inserts to packages, the combination of means for advancing intermittently a row of packages having pockets with openings at their upper sides extending diagonally of their direction of advance, means for moving an insert laterally to the direction of advance of the packages to partially introduce an insert into the pocket of a package, and means for moving the insert in the direction of advance of the packages to complete the introduction of the insert into the pocket.

5. In a machine for supplying inserts to packages, the combination of a runway for the advance of a row of packages having pockets in their upper sides with openings extending diagonally of the runway, means for moving an insert laterally of the runway to partially introduce an insert into the pocket of a package through its opening, and means for moving the insert in a direction longitudinally of the runway to complete the introduction of the insert into the pocket of the package.

6. In a machine for supplying inserts to packages, the combination of means for supporting a package having a slit in a side thereof, a magazine to contain inserts mounted to move toward the package supporting means in a direction at an angle to the slit in a package thereon, an ejector for ejecting the inserts from the magazine in a direction transverse to the direction of movement of the magazine, and means for operating the ejector to partially eject an insert in said transverse direction from the magazine and bring it to a projecting position to be partially entered in the slit in a package on said supporting means by movement of the magazine towards the package supporting means and for subsequently operating the ejector to complete the ejection of the insert in said transverse direction from the magazine and further enter it in the slit in the package.

7. In a machine for supplying inserts to packages, the combination of a runway for the advance of packages each having a slit in a side thereof extending diagonally of the runway, a magazine to contain inserts mounted to move laterally of the runway in to a position opposite thereto, an ejector for ejecting the inserts from the magazine in a direction transversely of the direction of movement of the magazine, and means for operating the ejector prior to the movement of the magazine toward the runway to first partially eject an insert in said transverse direction from the magazine and bring it into a position for partial introduction into the slit in a package in the runway by the lateral movement of the magazine toward the runway and for subsequently operating the ejector to complete the ejection of the insert in said transverse direction from the magazine while the magazine is opposite to the runway to complete the introduction of the insert into the slit in the package.

8. In a machine for supplying inserts to packages, the combination of a runway for the advance of packages each having a slit in a side thereof extending diagonally of the runway, a magazine to contain inserts mounted to move laterally of the runway toward and away from a position opposite thereto, an ejector for ejecting inserts from the magazine by movement transversely of the direction of movement of the magazine, and means for operating said ejector while the magazine is moved away from the runway to first advance an insert into a position to be partially entered in the slit in a package in the runway by the lateral movement of the magazine into a position opposite to the runway and to advance the insert to a further extent while the magazine occupies a position opposite to the runway and thereby further enter the insert in the slit in the package.

9. In a machine for supplying inserts to packages, the combination of a runway for the advance of packages each having a pocket in a side thereof, a member mounted to move laterally of the runway and carrying means for guiding inserts to the packages in the runway in a path at an acute angle to the length of the runway and the planes of the pocketed sides of the packages therein, and means for advancing an insert in a direction transversely of the lateral movement of said member to a position to project from said member for partial entry into the pocket of a package by the lateral movement of said member and for further advancing the insert in said path to further enter it in the pocket of the package.

10. In a machine of the character described, the combination of a support for a package having a slit in a side thereof, means to cooperate with the side of the package adjacent to said slit to open the latter, means for partially introducing an insert into said slit by movement of the insert in one direction relatively to the package while the slit therein is held open, and means for introducing the insert to a further extent into said slit by movement of the insert in another direction relatively to the package.

11. In a machine of the character described, the combination of a support for a package having a slit in a side thereof, a suction device mounted opposite to said support and movable toward and from a package thereon means for moving said suction device toward said support to engage a side of a package thereon adjacent to the slit therein and for moving said suction device away from said support to open the slit in the package and means movable relatively to said suction device and operative in coordination therewith to introduce an insert into said slit while held open by said suction device.

12. In a machine of the character described, the combination of a runway for the advance of a row of packages each having a pocket in a side thereof, a magazine mounted to move laterally of the runway toward and from a package therein and adapted to contain inserts, an ejector movable with and relatively to the magazine in a path transverse to the direction of movement of the magazine for ejecting inserts from the magazine, and means for operating the ejector to first advance an insert in said path into a position to be partially entered in the pocket in a package by the lateral movement of the magazine toward it and for subsequently operating the ejector in a path at an acute angle to the runway to advance the insert to further enter it in said pocket.

13. In a machine of the character described, the combination of a runway for the advance of a row of packages each having a pocket in a side thereof, a magazine mounted to move laterally of the runway toward and from a package therein and adapted to contain inserts, an ejector movable with the magazine and also movable in a path transverse to the direction of movement of the magazine for ejecting inserts from the magazine, means operative in coordination with the lateral movement of the magazine for opening the pocket in the package, and means for operating the ejector to first advance an insert in said path into position to be partially entered, by the lateral movement of the magazine, into the pocket in the package while held open by said pocket opening means and for subsequently operating the ejector to advance the insert to complete its entrance into the pocket of the package.

14. In a machine of the character described, the combination of a runway for the advance of a row of packages each having a pocket in a side thereof, a magazine mounted to move laterally of the runway toward and from the latter and a package therein and adapted to contain inserts, an ejector movable in a path transverse to the direction of movement of the magazine for ejecting inserts therefrom, a suction device movable transversely of the runway and having means controlled by the lateral movement of the magazine for engaging it with the package to open the pocket therein, and means for operating the ejector in said path to bring an insert into position to be partially entered, by the lateral movement of the magazine, into the pocket while held open by said suction device and for subsequently moving the ejector in a path at an acute angle to the length of the runway to further enter the insert into the pocket.

15. In a machine of the character described, the combination with a support for a package having a pocket in a side thereof, of a frame having a shaft mounted therein, a magazine supported by said shaft for swinging movement and adapted to contain a stack of inserts, an ejector also supported by said shaft and cooperative with the magazine, means for swinging the magazine and ejector toward and from a package on the support, and means for operating the ejector to position an insert for insertion into the pocket in the package as the magazine swings toward it.

16. In a machine of the character described, the combination with a support for a package having a pocket in a side thereof, of a frame having a shaft mounted therein, a magazine supported by said shaft for swinging movement and adapted to contain a stack of inserts, an ejector also supported by said shaft and cooperative with the magazine, means for swinging the magazine and ejector toward and from a package on the support, a suction device mounted on said frame to move toward and from a package on said support and controlled by the swing of the magazine for opening the pocket in the package, and means for operating the ejector to bring an insert into a position to enter the pocket in the package while the pocket is held open by said suction device.

17. In a machine of the character described, the combination with a support for a package having a pocket in a side thereof, of a frame having a shaft rotatably mounted therein, a magazine fixed to said shaft to swing toward and from a package on said support and adapted to contain a stack of inserts, an ejector carried by said shaft to swing with the magazine and cooperative therewith to eject inserts therefrom, a set of cams mounted rotatably on said shaft, means controlled by one of said cams for swinging the magazine and ejector toward and from a package on said support, a suction device mounted on said frame for movement toward and from a package on said support and operative to open the pocket in such package, means controlled by the swinging movement of the magazine for controlling the movements of the suction device toward and from the package, vacuum controlling means for the suction device controlled by another of said cams, and means controlled by still another of said cams for operating the ejector to first advance an insert into a position to enter, during the swing of the magazine, the pocket in the package while held open by the suction device and to subsequently further advance the insert to further enter it into the pocket in the package.

18. In a machine of the character described, the combination of a runway having means for advancing step by step a row of packages therein each having a slit extending diagonally of the runway, a frame mounted in fixed relation to the runway, a shaft mounted in an inclined position in said frame, a magazine mounted on said shaft to swing laterally toward and from a position opposite to the runway and adapted to contain inserts, an ejector mounted to swing and cooperate with the magazine and movable in a path inclined to the runway and transverse to the plane in which the magazine swings, a suction device mounted on said frame to move toward and from a package in the runway under control of the swinging movement of the magazine, a valve controlling the action of the suction device, and means operative while a package is at rest in the runway to actuate the ejector to project it from the magazine, operate the suction device to open the slit in the package, swing the magazine toward the package to enter the projecting portion of the insert laterally into the slit in the package, and to subsequently actuate the ejector to further enter the insert endwise into the slit in the package.

19. The method of supplying an insert to an article having an opening extending diagonally thereof, comprising partially introducing an insert into said opening by relative movement of the insert and article in a given plane in the direction of one dimension of the article, and introducing the insert further into said opening by relative movement of the insert and article in said plane but in the direction of another dimension of the article.

20. The method of supplying an insert to a package having a slit extending diagonally thereof, comprising opening the slit, introducing a corner of a rectangular insert into the opened slit by relative movement of the insert and package in the direction of one dimension of the package, and subsequently further introducing the insert into the slit by relative movement of the insert and package in the direction of another dimension of the package.

21. In a machine for supplying inserts to articles, the combination of a runway for the advance of articles each having a pocket opening in a side and extending diagonally of the direction of advance thereof, and a carrier mounted to move laterally of the runway into a position opposite thereto and having an insert supporting surface thereon which lies in a plane at an acute angle to the length of the runway when said carrier occupies a position opposite to the runway for presenting an insert in a position to enter the pocket of an article in the runway.

22. In a machine for supplying inserts to packages, the combination of a supporting surface for a package having a diagonal slit in a side thereof, an insert carrier mounted to swing laterally of said supporting surface into a position opposite thereto, and means on said carrier movable transversely of the direction of movement of the carrier and in a plane at an acute angle to the plane of said supporting surface for presenting an insert for introduction into the slit in a package on said supporting surface.

RICHARD C. TALBOT.
FREDERICK L. BEYER.